United States Patent
Wang et al.

(10) Patent No.: US 10,788,410 B2
(45) Date of Patent: Sep. 29, 2020

(54) GELATION CHARACTERIZATION IN SLIM TUBES

(71) Applicant: Saudi Arabian Oil Company, Dhahran (SA)

(72) Inventors: Jinxun Wang, Dhahran (SA); Abdulkareem AlSofi, Dhahran (SA); Amar Jaber M. Alshehri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 92 days.

(21) Appl. No.: 16/226,355

(22) Filed: Dec. 19, 2018

(65) Prior Publication Data
US 2020/0200669 A1 Jun. 25, 2020

(51) Int. Cl.
*G01N 15/08* (2006.01)
*G01F 1/48* (2006.01)
(Continued)

(52) U.S. Cl.
CPC ......... *G01N 15/0826* (2013.01); *E21B 47/10* (2013.01); *G01F 1/48* (2013.01);
(Continued)

(58) Field of Classification Search
CPC ............ G01N 15/0826; G01N 15/0806; G01F 7/005; G01F 1/48; E21B 47/10; G01M 99/00; C09K 8/588; C09K 8/58
See application file for complete search history.

(56) References Cited

U.S. PATENT DOCUMENTS

| 4,274,283 A * | 6/1981 | Maus | E21B 21/08 |
| | | | 73/152.22 |
| 4,691,558 A * | 9/1987 | Vinson | G01N 11/00 |
| | | | 73/64.41 |

(Continued)

FOREIGN PATENT DOCUMENTS

| EP | 0474284 | 3/1992 |
| GB | 2262117 | 6/1993 |

(Continued)

OTHER PUBLICATIONS

International Search Report and Written Opinion issued in International Application No. PCT/US2019/066578 dated Apr. 2, 2020, 14 pages.

(Continued)

*Primary Examiner* — Herbert K Roberts
*Assistant Examiner* — John M Royston
(74) *Attorney, Agent, or Firm* — Fish & Richardson P.C.

(57) ABSTRACT

A polymer is flowed through a slim tube including porous media until steady state is achieved. A temperature of the porous media with the polymer is adjusted to emulate a reservoir temperature. A slug of a gel solution is flowed through the porous media in the slim tube. The gel solution includes the polymer and a crosslinker. The gel solution is configured to at least partially solidify at the temperature. Multiple pressure drops across the porous media in the slim tube are measured at corresponding locations along a length of the slim tube while the slug flows through the porous media in the slim tube. The slug at least partially solidifies within the slim tube, causing an increase in pressure. A location of gelation of the slug of gel solution within the slim tube is determined based on the increase in pressure.

14 Claims, 4 Drawing Sheets

(51) Int. Cl.
 *E21B 47/10* (2012.01)
 *G01F 7/00* (2006.01)
 *C09K 8/588* (2006.01)
 *G01M 99/00* (2011.01)

(52) U.S. Cl.
 CPC .............. *G01F 7/005* (2013.01); *G01M 99/00* (2013.01); *G01N 15/0806* (2013.01); *C09K 8/588* (2013.01)

(56) References Cited

U.S. PATENT DOCUMENTS

| | | | |
|---|---|---|---|
| 5,101,903 | A | 4/1992 | Llave et al. |
| 2010/0234252 | A1 | 9/2010 | Moradi-Araghi et al. |
| 2014/0144628 | A1 | 5/2014 | Moradi-Araghi et al. |

FOREIGN PATENT DOCUMENTS

| | | |
|---|---|---|
| WO | WO2010105070 | 9/2010 |
| WO | WO2014082001 | 5/2014 |
| WO | WO2019231479 | 12/2019 |

OTHER PUBLICATIONS

He et al., "Comparison of Gelatin Behavior and Morphology of Resocinol—Hexamethylenetetramine—HPAM Gel in Bulk and Porous Media," Transport Porous Media, 2015, 16 pages.

Natarajan et al., "Control of In-Situ Gelation Time for HPAAM-Chromium Acetate Systems," SPE 39696, presented at the 1998 SPE/DOE Improved Oil Recovery Symposium, Apr. 19-22, 1998, 13 pages.

Wu and Batycky, "Evaluation of miscibility from slim tube tests," Enhanced Oil Recovery, JCPT 90-06-06, vol. 29, No. 6, Nov.-Dec. 1990, 9 pages.

Zhuang et al., "Permeability Modification with Sulfomethylated Resorcinol-Formaldehyde Gel System," SPE Reservoir Evaluation and Engineering, vol. 3, No. 5, presented at the 1997 SPE International Symposium on Oilfield Chemistry, Feb. 18-21, 1997, published Oct. 2000, 8 pages.

\* cited by examiner

GELATION CHARACTERIZATION IN SLIM TUBES

TECHNICAL FIELD

This disclosure relates to characterizing gelation behavior, for example, of gel solutions in porous media.

BACKGROUND

Gels can be used in conformance improvement treatments to reduce permeability in a reservoir. To select an appropriate gel technology that will function as desired, various design criteria can be considered. Some design factors that can be considered include final location of the gel within the reservoir, strength of the gel, required shut-in time following gel placement, state in which the gel is injected into the reservoir (for example, gelant, mature, or partially mature states), reservoir temperature, and overall treatment cost. In some cases, laboratory studies are conducted to predict gelation behavior within the reservoir once the gel has been injected. Such laboratory studies can aid in selecting the gel technology that will ultimately be used in the reservoir.

SUMMARY

This disclosure describes technologies relating to performing slim tube tests to characterize gelation behavior in porous media. Certain aspects of the subject matter described can be implemented as a method. A polymer is flowed through a slim tube including porous media until steady state is achieved. A temperature of the porous media with the polymer is adjusted to emulate a reservoir temperature. A slug of a gel solution is flowed through the porous media in the slim tube. The gel solution includes the polymer and a crosslinker. The gel solution is configured to at least partially solidify at the temperature. Multiple pressure drops across the porous media in the slim tube are measured at corresponding locations along a length of the slim tube while the slug flows through the porous media in the slim tube. The slug at least partially solidifies within the slim tube, causing an increase in pressure. A location of gelation of the slug of gel solution within the slim tube is determined based on the increase in pressure.

This, and other aspects, can include one or more of the following features.

The slim tube can include multiple pressure taps at the corresponding locations along the length of the slim tube.

The slim tube can be coiled. The porous media can be selected from sand or glass beads.

Adjusting the temperature of the porous media with the polymer can include maintaining the porous media with the polymer between approximately 70° F. and approximately 400° F.

The slim tube can be flushed with bleach to clean the slim tube for reuse.

The slim tube can be flushed with an oxidizer to clean the slim tube for reuse.

The polymer can include polyacrylamide, acrylamide copolymer, polysaccharide, or combinations of these.

The crosslinker can include hexamethylenetetramine, resorcinol, chromium acetate, chromium malonate, polyethyleneimine, or combinations of these.

The slug of the gel solution can be allowed to fully solidify within the slim tube. After allowing the gel solution to fully solidify, a stability of the slug can be determined based on the measured pressure drops.

The slim tube can be pre-flushed with water until steady state is achieved before injecting the polymer of the gel solution into the slim tube.

The slug of the gel solution can be between approximately 0.1 and approximately 0.4 pore volumes of the porous media in the slim tube.

Achieving steady state can include allowing a pressure profile of the slim tube to stabilize.

Flowing the slug through the porous media in the slim tube can include flowing the polymer into the slim tube to push the slug through the porous media in the slim tube.

The porous media in the slim tube can be saturated with a fluid including water before flowing the polymer.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Core samples can be used to determine and characterize gelation under reservoir conditions. But long core samples (which can be difficult to obtain and also often do not offer repeatability of experiments) are typically necessary to simulate gelation in porous media, especially in deep-diversion applications. Slim tubes can be used instead of core samples to simulate gelation in porous media. A slim tube is a long coiled tube filled with sand, glass beads, or similar porous media (of a specific or varied mesh size). Slim tube tests are typically used to estimate the minimum miscibility pressure or minimum miscibility concentration of a given injection solvent and reservoir oil. Solvent injection can be performed at several test pressures, and effluent production, density, and composition can be measured as functions of the injected volume. The data from a slim tube test can then be used, for example, as input to tune a fluid equation of state for reservoir simulation. This disclosure describes performing slim tube tests to characterize gelation behavior, specifically gelation time, in porous media. Pressure taps are positioned along the length of the slim tube for pressure measurements throughout the tests. Slim tubes are typically easier to handle compared to core samples and also can be tested repeatedly, for example, to verify test results.

An example test method includes fully saturating and flushing the slim tube (already packed with sand or glass beads) with water or brine. A polymer (the same used for preparing the gel of interest) is flowed through the porous media in the slim tube until pressure drop across the slim tube stabilizes. A slug of the gel solution (including the polymer and a crosslinker) is then flowed in the slim tube, followed by an injection of the polymer alone (in contrast to brine injection, which can sometimes cause viscous fingering and dilution of the gel system). Pressure drop is measured at the various locations along the length of the slim tube and monitored during the injection steps, and the dynamic in situ behavior of the gel can be characterized. When gelation of the gel solution begins (that is, the gel solution begins to form into a gel), pressure drop across at least a portion of the slim tube will start to increase. It may be desirable to determine the beginning location and time of this gelation, and in some cases, it may be desirable to continue to monitor the gelation behavior of the gel as it travels through the slim tube and continues to gel. The gelation time and location can be determined based on the rate of travel of the gel through the slim tube and the time when a significant pressure increase (for example, a pressure increase by a factor of 2) is observed. Once the gel solution has fully gelled to form the gel, fluid flow through the slim tube may be blocked by the gel. Such gel solutions can be injected into subterranean zones (for example, a hydrocarbon-containing rock formation) for remediation purposes, for example, reducing permeability. The behavior of the gel can reveal how the gel would behave in the matrix of the hydrocarbon-containing rock formation. The results of such gelation tests can also aid in determining a sufficient amount of the gel solution to inject within the subterranean zone for remediation.

Figure 1A:
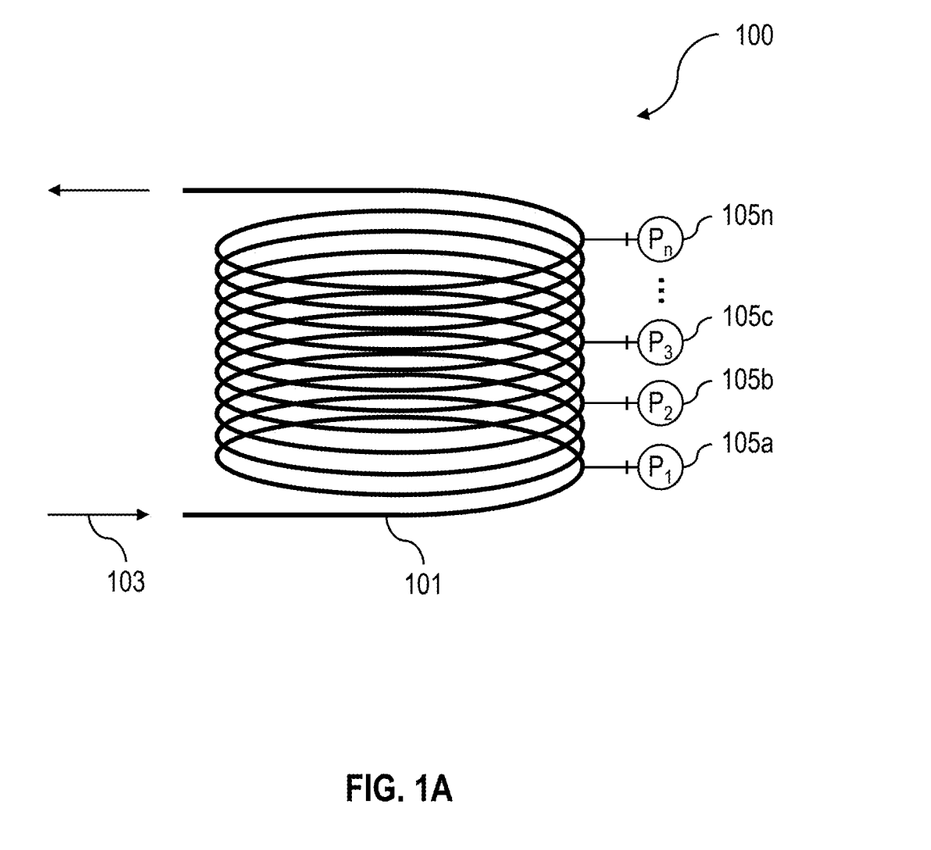
FIG. 1A is a schematic diagram of an example slim tube apparatus.

FIG. 1A illustrates an example slim tube apparatus 100 that can be used to implement the gelation test. The slim tube apparatus 100 includes a slim tube 101, which can be coiled to allow for long lengths of tubing to fit within a 3-dimensional space. In some implementations, the slim tube 101 has a length of less than 40 feet. In some implementations, the slim tube 101 has a length of at least 40 feet (for example, 80 feet). The length of the slim tube 101 can translate to a maximum duration of a gelation test. For example, for a darcy velocity of 1 foot per day of a gel solution traveling through the slim tube 101, a slim tube 101 with a length of 40 feet would allow study of gelation of the gel solution traveling through the slim tube 101 over a 40-day period. In some implementations, the slim tube 101 has an outer diameter of between approximately ¼ inch and approximately ⅜ inch. In this disclosure, "approximately" means a deviation or allowance of up to 10 percent (%) and any variation from a mentioned value is within the tolerance limits of any machinery used to manufacture the part. In some implementations, the slim tube 101 has a tube wall thickness (that is, the difference between the outer diameter and the inner diameter of the slim tube 101) of approximately 0.036 inch and approximately 0.065 inch.

It is desirable for the slim tube 101 to resist corrosion and oxidation. The slim tube 101 can be made of a material that is resistant to corrosion and oxidation when exposed to the fluids utilized in the test methods described in this disclosure (such as brine solutions and acidic fluids). The slim tube 101 can be made of a material that is resistant to corrosion and oxidation under the operating conditions of the test methods described in this disclosure, for example, at temperatures between approximately 70 degrees Fahrenheit (° F.) and approximately 400° F. and under pressures between atmospheric pressure and approximately 10,000 pounds per square inch gauge (psig). A few non-limiting examples of suitable materials for the slim tube 101 include stainless steel, nickel-based alloys (such as Hastelloy), and titanium.

The slim tube 101 can include multiple pressure taps (for example, pressure taps 105a and 105b) positioned at various locations along the length of the slim tube 101. The slim tube 101 can include as many pressure taps as desired, for example, n pressure taps, where n is an integer number (therefore, the slim tube 101 includes pressure taps 105a, . . . , 105n). Each of the pressure taps (105a, 105b, etc.) can be used to determine an absolute pressure within the slim tube 101 at each of the locations of the respective pressure taps along the length of the slim tube 101 or a differential pressure within the slim tube 101 between the location of the respective pressure tap and another location within the slim tube 101 (for example, upstream or downstream of the respective pressure tap).

The various pressure taps can be spaced equally apart from each other along the length of the slim tube 101. For example, an 80-foot long slim tube 101 can include three pressure taps (105a, 105b, 105c) spaced apart by 20-foot intervals. The pressure taps (such as 105a) can be sealed to prevent leakage of fluid from the slim tube 101. In some implementations, the slim tube 101 is made of several slim tube segments (for example, four 20-foot slim tube segments) that are connected together (to form the slim tube 101), and the pressure taps (for example, 105a, 105b, and 105c) connect the segments together. In some implementations, each of the pressure taps (for example, 105a, 105b, and 105c) can include a pressure transducer and a fitting with a three-way connection in which two of the connections connect neighboring tube segments together, and the third connection connects with the pressure transducer. In some implementations, each of the pressure taps (such as 105a) can measure a pressure drop across a respective slim tube segment (that is, between the inlet and the outlet of the respective slim tube segment). In some implementations, each of the pressure taps (such as 105a) can measure a pressure drop between the inlet of the slim tube 101 and the location along the slim tube 101 at which the respective pressure tap (105a) is installed. In some implementations, each of the pressure taps (such as 105a) can measure a pressure drop between the location along the slim tube 101 at which the respective pressure tap (105a) is installed and the outlet of the slim tube 101. In some implementations, switching valves (not shown) can be installed and programmed to switch between various connection schemes. Each of the pressure taps (for example, 105a, 105b, and 105c) can be connected to a computer or wirelessly communicate with a computer, and the computer can be used, for example, to receive and store pressure readings from the pressure taps.

The slim tube 101 can include as many or as few pressure taps as desired. Having more pressure taps installed along the length of the slim tube 101 can provide increased resolution of a measured pressure profile of the slim tube 101. A fluid (such as a gel solution 103) can be flowed through the porous media in the slim tube 101, and the pressure taps (for example, 105a, 105b, and 105c) can be used to determine the pressure of the flowing fluid within the slim tube 101 at the various locations in which the pressure taps are positioned along the slim tube 101.

Figure 1B:
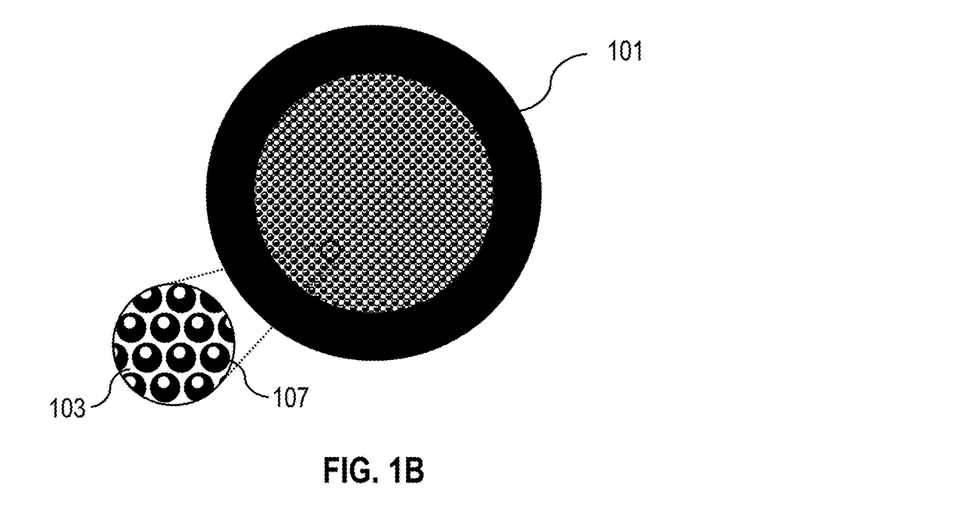
FIG. 1B is a cross-sectional view of a portion of the slim tube apparatus of FIG. 1A.

FIG. 1B illustrates a cross-section of a portion of the slim tube 101. As shown, porous media 107 is packed within the slim tube 101. The porous media 107 can be, for example, silica sand, glass beads, ground sandstone, or ground limestone. The slim tube 101 can be packed with the porous media 107 before the gelation test begins. The porous media 107 can be used to mimic the void volume in a rock core sample. In some implementations, the porous media 107 can be of uniform size, for example, a mesh size ranging from 10 to 200. In some cases, the void volume of a rock core sample is not uniform (for example, mesh sizes varying between 10 and 200), so the porous media 107 can have varied size and distributed across the length of the slim tube 101 to mimic the non-uniform void volume of the rock core sample. For example, the porous media 107 within the slim tube 101 can have a permeability between approximately 1 darcy to approximately 900 darcies, and the permeability of the porous media 107 can be varied or uniform across the length of the slim tube 101. The flow of a fluid (such as the gel solution 103) through the porous media 107 within the slim tube 101 can emulate the interaction of the fluid with a reservoir rock. For example, in some instances, the porous media 107 may provide mechanical disturbance to the dynamic flow of the gel solution 103 as it gels. The porous media 107 in the slim tube 101 can be more representative of an actual reservoir, and the interaction of the gel solution 103 flowing through the porous media 107 in the slim tube 101 can better emulate the interaction of the gel solution 103 with the actual reservoir.

Figure 1C:
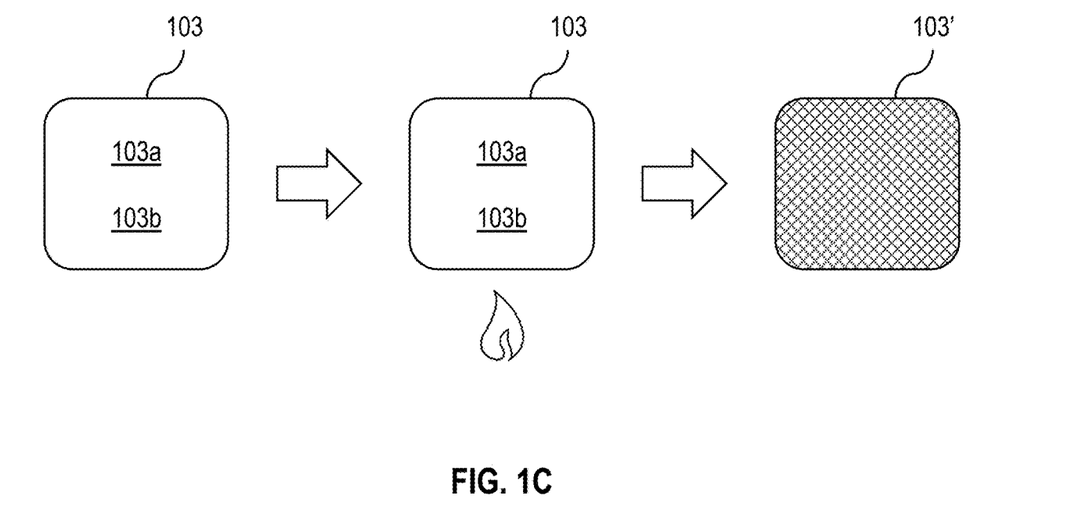
FIG. 1C is a progression of schematic diagrams illustrating gelation of an example gel solution.

FIG. 1C conceptually illustrates the gel solution 103 that can be tested using the slim tube apparatus 100. The left portion of FIG. 1C shows the gel solution 103 including a polymer 103*a* and a crosslinker 103*b*. The polymer 103*a* can be polyacrylamide, an acrylamide copolymer, a polysaccharide, or a combination of these. Some non-limiting examples of suitable polysaccharides include xanthan gum, schizophyllan, diutan gum, and scleroglucan. The crosslinker 103*b* is a molecule that can react with the polymer 103*a* to link molecules of the polymer 103*a* to one another. The crosslinking reaction can be initiated, for example, by heat, pressure, change in pH, or radiation. In some implementations, the crosslinker 103*b* is hexamethylenetetramine, resorcinol, chromium acetate, chromium malonate, polyethyleneimine, or a combination of these. Exposing the gel solution 103 to heat, pressure, a change in pH, or radiation (shown by the middle portion of FIG. 1C) can cause the gel solution 103 to crosslink and thereby solidify and form a gel 103' (shown by the right portion of FIG. 1C). In relation to the porous media 107 in the slim tube 101, the porous media 107 may absorb a portion of the gel solution 103 and may reduce the effective concentration of the polymer 103*a*, the crosslinker 103*b*, or both.

Figure 1D:
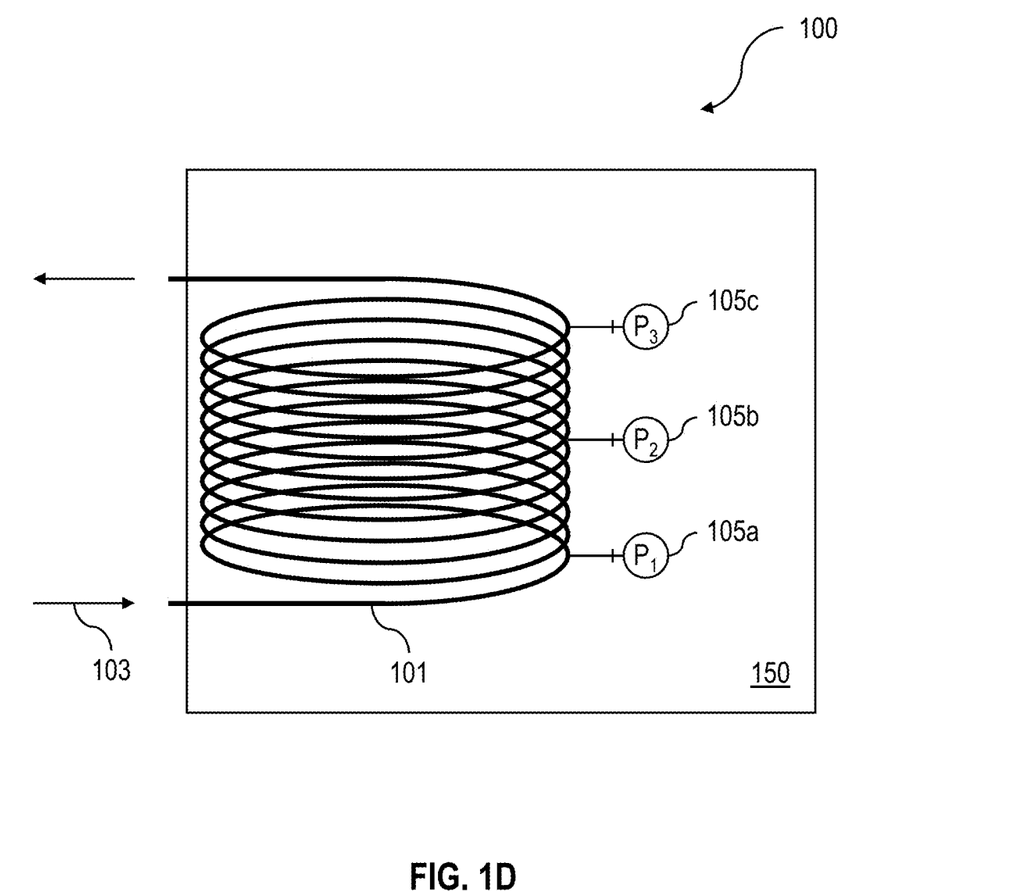
FIG. 1D is a schematic diagram of an example slim tube apparatus including a heat source.

FIG. 1D illustrates the slim tube apparatus 100, which can be used to adjust the temperature of the slim tube 101 and its contents (such as the porous media 107 shown in FIG. 1B and any fluid flowing through). The slim tube apparatus 100 of FIG. 1D includes the same components of the slim tube apparatus 100 shown in FIG. 1A. The slim tube apparatus 100 can also include a heat source 150. The heat source 150 can be, for example, an oven, a furnace, an electric heater, heat tracing lining the slim tube 101, electrical tape lining the slim tube 101, a fluid bath in which the slim tube 101 is immersed, or a combination of these. The heat source 150 can be used to maintain a temperature that emulates a hydrocarbon reservoir temperature. For example, the heat source 150 can be used to maintain a temperature of between approximately 70° F. and approximately 400° F. In some implementations, the heat source 150 can be used to adjust the temperature while the gelation test is being performed. For example, the heat source 150 can be used to vary the temperature between approximately 70° F. and approximately 400° F. while the gelation test is being performed. In some implementations, the slim tube apparatus can include a temperature measuring instrument (not shown), such as a thermocouple or a thermometer. The temperature measuring instrument can be connected to or wirelessly communicate with a computer, and the computer can be used, for example, to receive and store temperature readings from the temperature measuring instrument.

The slim tube apparatus 100 can include an injection pump (not shown) to inject fluid into the slim tube 101. In some implementations, the injection pump can inject fluid into the slim tube 101 at a constant flow rate ranging between approximately 0.001 milliliters per minute (mL/min) and approximately 10 mL/min. In some implementations, the injection pump can inject fluid into the slim tube 101 at a constant injection pressure ranging between approximately 1 psig and approximately 10,000 psig. In some implementations, the slim tube apparatus 100 can include a valve downstream of the injection pump. The valve can be used to vary the flow rate of the fluid being injected into the slim tube 101. The valve can be used to vary the pressure of the fluid being injected into the slim tube 101. In some implementations, the slim tube apparatus 100 can include a backpressure regulator (not shown) to maintain the outlet pressure of the outlet of the slim tube 101 at a constant pressure value.

Figure 2:
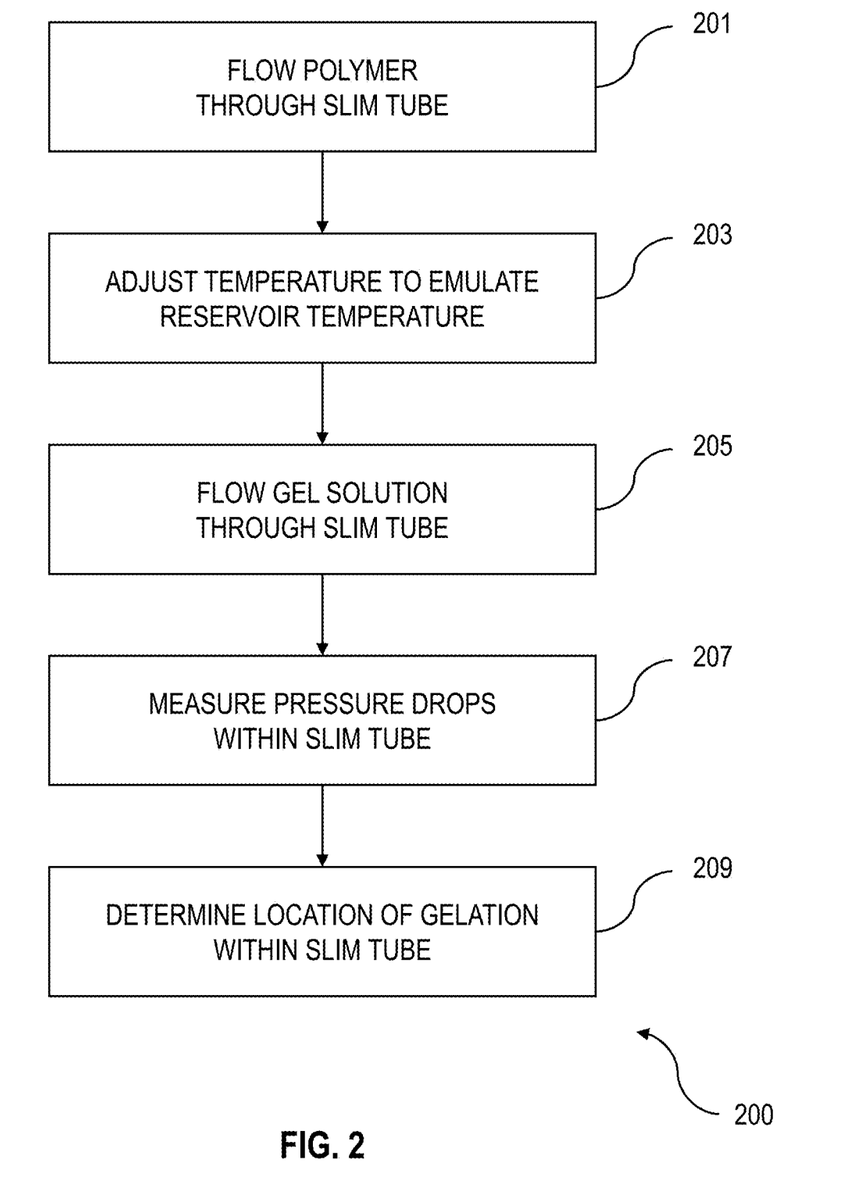
FIG. 2 is a flow chart of a method for using the slim tube apparatus of FIG. 1D.

FIG. 2 is a flow chart illustrating an example method 200 for performing a gelation test with a slim tube apparatus (such as the slim tube apparatus 100). At step 201, a polymer (for example, polymer 103*a*) is flowed through a slim tube (for example, slim tube 101) including porous media (for example, porous media 107) until steady state is achieved. In some implementations, achieving steady state involves allowing the pressure drop across the slim tube 101 to stabilize over time. The polymer 103*a* can be flowed through the porous media 107 until the pressure profile of the slim tube 101 stabilizes (remains the same over time). For example, while flowing the polymer 103*a* through the slim tube 101, if the pressure drop measured across the slim tube 101 (for example, between the inlet and outlet of the slim tube 101) is within 0 to 1 pound per square inch differential (psid) of the pressure drop measured across the slim tube 101 after a time period (for example, 5 seconds), then steady state can be said to be achieved. As another example, while flowing the polymer 103*a* through the slim tube 101, if the variation of the pressure drop measured across the slim tube 101 (for example, between the inlet and outlet of the slim tube 101) is within approximately 1% after a time period (for example, 10 minutes), then steady state can be said to be achieved. The polymer 103*a* can be flowed through the porous media 107 at a constant flow rate or a varied flow rate (for example, between approximately 0.001 mL/min and approximately 0.1 mL/min). In some implementations, the slim tube 101 with porous media 107 is saturated with a fluid including water (such as water or brine) before the polymer 103*a* is flowed through the porous media 107 at step 201.

At step 203, a temperature of the porous media 107 filled with the polymer 103*a* is adjusted to emulate a reservoir temperature. The temperature can be adjusted using a heat source (for example, heat source 150). In some implementations, the temperature is adjusted to be between approximately 70° F. and approximately 400° F. In some implementations, this elevated temperature is maintained throughout the gelation test. In some implementations, the temperature is varied throughout the gelation test. In some implementations, the temperature is varied across the length of the slim tube 101 throughout the gelation test. The elevated temperature can cause a gel solution (for example, gel solution 103) to solidify. For example, the elevated temperature can initiate crosslinking of the gel solution 103 (including polymer 103*a* and the crosslinker 103*b*) to begin formation of the gel 103'. In some implementations, an operating pressure within the slim tube 101 can also emulate reservoir conditions. For example, the operating pressure within the slim tube 101 can range from atmospheric pressure to approximately 10,000 psig.

At step 205, a slug of a gel solution (for example, gel solution 103) is flowed through the porous media 107 in the slim tube 101. The gel solution 103 includes the polymer 103a and a crosslinker (for example, crosslinker 103b). In some implementations, the polymer 103a and the crosslinker 103b is mixed together to form the gel solution 103 before the slug of the gel solution 103 is flowed through the porous media 107 in the slim tube 101. In some implementations, the polymer 103a and the crosslinker 103b are both simultaneously injected into the slim tube 101. The polymer 103a and the crosslinker 103b can mix in the slim tube 101 as both the polymer 103a and the crosslinker 103b flow through the porous media 107 in the slim tube 101. In some implementations, the polymer 103a and the crosslinker 103b are sequentially injected into the slim tube 101 (for example, the polymer 103a and then the crosslinker 103b or the crosslinker 103b and then the polymer 103a). In some implementations, the sequential injection of the polymer 103a and the crosslinker 103b into the slim tube 101 is separated by an injection of a brine slug (for example, a slug of an aqueous saline solution) into the slim tube 101. For example, the sequential injection of fluids into the slim tube 101 can be an injection of the polymer 103a, then an injection of the brine, and then an injection of the crosslinker 103b. For example, the sequential injection of fluids into the slim tube 101 can be an injection of the crosslinker 103b, then an injection of the brine, and then an injection of the polymer 103a. The intermediate injection of brine may, in some cases, delay gelation of the gel solution 103.

The gel solution 103 (mixture including the polymer 103a and the crosslinker 103b) is configured to at least partially solidify at the adjusted temperature of step 203. The slug of the gel solution 103 can have a small volume. In some implementations, the slug of the gel solution 103 is between approximately 0.1 and approximately 0.4 pore volumes of the porous media 107 in the slim tube. In some implementations, the porous media 107 has a porosity of approximately 20% to approximately 50% (for example, approximately 35%). The porosity of porous media 107 can emulate the porosity of the reservoir.

At step 207, multiple pressure drops across the porous media 107 in the slim tube 101 are measured at corresponding locations along a length of the slim tube 101 while flowing the slug of the gel solution 103 through the porous media 107 in the slim tube 101. The pressure drops can be measured using various pressure taps (105a, 105b, etc.) at the corresponding locations along the length of the slim tube 101. For example, each of the pressure taps (105a, 105b, etc.) can measure a pressure drop between the location of the respective pressure tap along the length of the slim tube 101 and the outlet of the slim tube 101. The polymer 103a can be flowed into the slim tube 101 to push the slug of the gel solution 103 through the porous media 107 in the slim tube 101. The polymer 103a can flow at a flow rate between approximately 0.001 mL/min and approximately 0.1 mL/min (for example, 0.001 mL/min, 0.005 mL/min, or 0.01 mL/min). Because of the elevated temperature (set at step 203), the slug of the gel solution 103 can solidify as it flows through the slim tube 101. The solidification (that is, the gelation) of the slug of the gel solution 103 can cause an increase in pressure within the slim tube 101.

At step 209, a location of gelation of the slug of the gel solution 103 within the slim tube 101 is determined based on the increase in pressure within the slim tube 101. The gelation of the slug of the gel solution 103 can, for example, cause the pressure drop at the location of gelation to increase by at least two-fold in comparison to an initial pressure drop right after the slug of gel solution 103 is flowed through the porous media 107 in the slim tube 101 at step 205. The time between the introduction of the slug of the gel solution 103 into the slim tube 101 and this increase in pressure differential can be recorded. The location of gelation within the slim tube 101 can be determined based on the elapsed time (for example, between introducing the slug of gel solution 103 at step 205 and gelation of the slug) and the flow rate of the polymer 103a pushing the slug of the gel solution 103 through the porous media 107 in the slim tube 101. For example, if the slug is pushed through the porous media 107 by the polymer 103a being flowed into the slim tube 101 at a flow rate corresponding to the slug of gel solution 103 travelling through the porous media 107 at a rate of 1 foot per day, and the increase in pressure is measured at the first pressure tap 105a after 5 days of the slug being introduced to the slim tube 101, it can be determined that the location of gelation was at 5 feet along the length of the slim tube 101 from the inlet of the slim tube 101.

Darcy's Law (Equation 1) can also be used to quantitatively characterize a decrease of permeability of the gel 103' after gelation has occurred.

$$K = \frac{Q\mu L}{A \Delta P} \quad (1)$$

where K is the permeability, Q is the flow rate of the flowing fluid, $\mu$ is viscosity of the flowing fluid, A is the cross-sectional area of the flow, $\Delta P$ is the total pressure drop, and L is the length over which the pressure drop is taking place.

A resistance factor (RF) can be used to characterize the reduction of fluid mobility (for example, due to gelation). The resistance factor can be calculated by the ratio of mobility of the fluid before and after gelation. Mobility is the ratio of permeability (K) to viscosity ($\mu$) of the fluid (such as the gel solution 103). Gelation of the gel solution 103 to form the gel 103' can cause a decrease in permeability and an increase in fluid viscosity. At a constant injection flow rate, the resistance factor can also be calculated by the ratio of pressure drop across at least a portion of the slim tube 101 after and before gelation, per Equation 2:

$$RF = \frac{\left(\frac{K}{\mu}\right)_{before\ gelation}}{\left(\frac{K}{\mu}\right)_{after\ gelation}} = \frac{\Delta P_{after\ gelation}}{\Delta P_{before\ gelation}} \quad (2)$$

For example, if the pressure drop across a length along the slim tube 101 is 1 psid before gelation and the pressure drop across the length along the slim tube 101 increases to 100 psid after gelation, then the resistance factor can be determined to be 100 due to gelation of the gel solution 103. In other words, the mobility of the gel 103' after gelation is reduced to 1% of the original mobility of the gel solution 103 before gelation.

After completing the gelation test at 209, the slim tube 101 can be flushed with bleach to clean the slim tube 101 for reuse (for example, repeat the gelation test starting at step 201). In some implementations, the slim tube 101 is flushed with water, brine, or both, after being flushed with bleach. In some implementations, the slim tube 101 is flushed with an oxidizer to clean the slim tube 101 for reuse. Some non-limiting examples of suitable oxidizers for cleaning the slim tube 101 include hydrogen peroxide, sodium hypochlorite, and ammonium peroxide. In some implementations, the slim tube 101 is flushed with water, brine, or both, after being flushed with the oxidizer. In some implementations, the slug of the gel solution 103 is allowed to fully solidify into the gel 130' within the slim tube 101, and then a stability of the gel can be determined based on the pressure drops measured across the slim tube 101, for example, after a period of thermal exposure, chemical exposure, or a combination of both. For example, a decrease in pressure drop can signify that the gel 130' has begun to degrade.

While this disclosure contains many specific implementation details, these should not be construed as limitations on the scope of the subject matter or on the scope of what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method comprising:
    flowing a polymer through a slim tube comprising porous media until steady state is achieved;
    adjusting a temperature of the porous media with the polymer to emulate a reservoir temperature;
    flowing a slug of a gel solution through the porous media in the slim tube, wherein the gel solution comprises the polymer and a crosslinker, the gel solution configured to at least partially solidify at the temperature;
    measuring a plurality of pressure drops across the porous media in the slim tube at a corresponding plurality of locations along a length of the slim tube while flowing the slug through the porous media in the slim tube, wherein the slug at least partially solidifies within the slim tube causing an increase in pressure; and
    determining a location of gelation of the slug of gel solution within the slim tube based on the increase in pressure.

2. The method of claim 1, wherein the slim tube comprises a plurality pressure taps at the corresponding plurality of locations along the length of the slim tube.

3. The method of claim 1, wherein the slim tube is coiled, and the porous media is selected from sand or glass beads.

4. The method of claim 1, wherein adjusting the temperature of the porous media with the polymer comprises maintaining the porous media with the polymer between approximately 70° F. and approximately 400° F.

5. The method of claim 1, further comprising flushing the slim tube with bleach to clean the slim tube for reuse.

6. The method of claim 1, further comprising flushing the slim tube with an oxidizer to clean the slim tube for reuse.

7. The method of claim 1, wherein the polymer comprises polyacrylamide, acrylamide copolymer, polysaccharide, or combinations thereof.

8. The method of claim 1, wherein the crosslinker comprises hexamethylenetetramine, resorcinol, chromium acetate, chromium malonate, polyethyleneimine, or combinations thereof.

9. The method of claim 1, further comprising:
    allowing the slug of the gel solution to fully solidify within the slim tube; and
    after allowing the gel solution to fully solidify, determining a stability of the slug based on the measured pressure drops.

10. The method of claim 1, further comprising pre-flushing the slim tube with water until steady state is achieved before injecting the polymer of the gel solution into the slim tube.

11. The method of claim 1, wherein the slug of the gel solution is between approximately 0.1 and approximately 0.4 pore volumes of the porous media in the slim tube.

12. The method of claim 1, wherein achieving steady state comprises allowing a pressure profile of the slim tube to stabilize.

13. The method of claim 1, wherein flowing the slug through the porous media in the slim tube comprises flowing the polymer into the slim tube to push the slug through the porous media in the slim tube.

14. The method of claim 1, further comprising saturating the porous media in the slim tube with a fluid comprising water before flowing the polymer.

* * * * *

UNITED STATES PATENT AND TRADEMARK OFFICE
CERTIFICATE OF CORRECTION

PATENT NO. : 10,788,410 B2
APPLICATION NO. : 16/226355
DATED : September 29, 2020
INVENTOR(S) : Wang et al.

Page 1 of 1

It is certified that error appears in the above-identified patent and that said Letters Patent is hereby corrected as shown below:

In the Claims

Column 10, Line 11, Claim 2 after "plurality" insert -- of --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*